United States Patent
Foth et al.

(10) Patent No.: US 7,369,681 B2
(45) Date of Patent: May 6, 2008

(54) SYSTEM AND METHOD FOR TRACKING POSITIONS OF OBJECTS IN SPACE, TIME AS WELL AS TRACKING THEIR TEXTUAL EVOLUTION

(75) Inventors: Thomas J. Foth, Trumbull, CT (US); Brian M. Romansky, Monroe, CT (US); Christopher C. Lang, Madison, WI (US); Anand V. Chhatpar, Madison, WI (US)

(73) Assignee: Pitney Bowes Inc., Stamford, CT (US)

( * ) Notice: Subject to any disclaimer, the term of this patent is extended or adjusted under 35 U.S.C. 154(b) by 925 days.

(21) Appl. No.: 10/664,542

(22) Filed: Sep. 18, 2003

(65) Prior Publication Data

US 2005/0062849 A1    Mar. 24, 2005

(51) Int. Cl.
*G06K 9/00* (2006.01)
*H04N 5/225* (2006.01)

(52) U.S. Cl. ........................ 382/103; 348/169
(58) Field of Classification Search ........... 382/101, 382/102, 112, 135–140, 181–208, 229–231, 382/103; 348/169–172
See application file for complete search history.

(56) References Cited

U.S. PATENT DOCUMENTS

| | | | |
|---|---|---|---|
| 4,457,016 A * | 6/1984 | Pfeffer | 382/313 |
| 5,287,414 A * | 2/1994 | Foster | 382/100 |
| 5,455,410 A * | 10/1995 | Schneider | 235/385 |
| 5,485,000 A * | 1/1996 | Schneider | 235/494 |
| 5,569,317 A | 10/1996 | Sarada et al. | |
| 5,684,069 A | 11/1997 | Auslander | |
| 5,936,527 A * | 8/1999 | Isaacman et al. | 340/572.1 |
| 5,963,134 A * | 10/1999 | Bowers et al. | 340/572.1 |
| 5,977,875 A * | 11/1999 | Lin et al. | 340/570 |
| 6,195,006 B1 * | 2/2001 | Bowers et al. | 340/572.1 |
| 6,260,049 B1 * | 7/2001 | Fitzgerald et al. | 707/104.1 |
| 6,333,690 B1 * | 12/2001 | Nelson et al. | 340/539.21 |
| 6,499,665 B1 * | 12/2002 | Meunier et al. | 235/487 |
| 6,513,921 B1 | 2/2003 | Houle | |
| 6,554,188 B1 * | 4/2003 | Johnson et al. | 235/385 |
| 6,628,412 B1 * | 9/2003 | Jeran et al. | 358/1.14 |
| 6,644,764 B2 * | 11/2003 | Stephens, Jr. | 347/3 |
| 6,653,937 B2 * | 11/2003 | Nelson et al. | 340/539.1 |
| 6,744,936 B2 * | 6/2004 | Irons et al. | 382/306 |
| 6,775,422 B1 * | 8/2004 | Altman | 382/305 |
| 6,860,422 B2 * | 3/2005 | Hull et al. | 235/376 |
| 6,933,849 B2 * | 8/2005 | Sawyer | 340/572.4 |
| 6,972,787 B1 * | 12/2005 | Allen et al. | 348/162 |
| 7,019,642 B2 * | 3/2006 | Nelson et al. | 340/539.1 |

(Continued)

*Primary Examiner*—Aaron W Carter
(74) *Attorney, Agent, or Firm*—Ronald Reichman; Angelo N. Chaclas (57) ABSTRACT

A system and method including cameras for monitoring objects such as documents, at multiple locations, and for recording the objects' movement through space and time. The objects are marked with unique identifiers, and the invention is adaptable for recording and recognizing the objects' development using character recognition. A center receives the information from the cameras, and that information is searchable. Advantageously, the unique identifiers are printed with ink that is invisible unless it fluoresces or phosphoresces, the digital cameras include an ultraviolet flash to cause the identifiers to fluoresce or phosphoresce at a certain wavelength, and the cameras are equipped with filters to filter out wavelengths other than the certain wavelength. Packages or pads of pre-marked blank paper are adaptable for use with the present invention.

18 Claims, 5 Drawing Sheets

U.S. PATENT DOCUMENTS

| | | | |
|---|---|---|---|
| 2001/0000019 A1* | 3/2001 | Bowers et al. | 340/572.1 |
| 2001/0053981 A1* | 12/2001 | Wyssen | 705/1 |
| 2002/0063744 A1* | 5/2002 | Stephens, Jr. | 347/19 |
| 2003/0095186 A1* | 5/2003 | Aman et al. | 348/162 |
| 2004/0008114 A1* | 1/2004 | Sawyer | 340/572.1 |
| 2004/0027604 A1* | 2/2004 | Jeran et al. | 358/1.14 |
| 2004/0079796 A1* | 4/2004 | Hull et al. | 235/375 |
| 2004/0263335 A1* | 12/2004 | Molnar | 340/572.1 |
| 2005/0062603 A1* | 3/2005 | Fuerst et al. | 340/539.12 |
| 2006/0028689 A1* | 2/2006 | Perry et al. | 358/3.28 |

* cited by examiner

SYSTEM AND METHOD FOR TRACKING POSITIONS OF OBJECTS IN SPACE, TIME AS WELL AS TRACKING THEIR TEXTUAL EVOLUTION

TECHNICAL FIELD

The present invention relates to camera monitoring systems, and more particularly to camera networks for monitoring positions and locations of objects such as documents that move between different locations.

BACKGROUND OF THE INVENTION

Systems for electronically monitoring changes of physical documents have already been developed that entail attaching electronic files to physical objects, by putting the electronic files on removable media such as disks, tapes, or CD's and then attaching the removable media to the physical object using a clip or using a common folder, stack or other container. Some disadvantages with this solution are that the electronic attachment is bulky, may be accidentally detached, and cannot be accessed remotely or through a network (e.g., one could not include the electronic files in network-wide searches when stored this way).

Another solution is to virtually attach some code to the electronic file indicating where the physical object is supposed to be filed. This type of system is analogous to an electronic catalog of library books. Some disadvantages of this solution are that the object might not be where it is "supposed" to be filed, and moreover, this type of solution does not empower the user to use the physical object to find the electronic file. To solve the latter problem, one might attach a machine-readable physical tag, such as a Radio Frequency Identification (RFID) or barcode, to the physical document, so that the electronic files are invoked when the tag is detected. Disadvantages of this approach include the cost of tagging the objects and that either the object is defaced or the tags can accidentally become detached. That would still leaves the first problem, which is that the object is not where it is supposed to be. Additional problems with this type of solution, as applied to an office environment, is that the process of updating the library-type database would be very labor-intensive, especially if the changing content of office documents is also to be recorded in the electronic database.

Both fluorescent and phosphorescent inks are well known in the art. See, for example, Sarada et al. (U.S. Pat. No. 5,569,317); Houle (U.S. Pat. No. 6,513,921); Auslander (U.S. Pat. No. 5,684,069). Both fluorescent and phosphorescent inks are luminescent, the difference being that the latter continue to glow for a time after the stimulating source has been removed. Neither of these types of inks, nor any other comparable identifying technique, has been utilized in conjunction with cameras to monitor objects such as documents at various locations as functions of time, or to coordinate those physical objects with electronic versions thereof.

SUMMARY OF THE INVENTION

The present invention is a system and method for using cameras to monitor objects such as documents, at various different locations, and for recording the objects' movement through space and time. The objects include unique identifiers, and the invention is furthermore adaptable for recording and recognizing the objects' evolving development using character recognition. A processing center receives the information from the cameras, and then that information is searchable. Although the objects monitored by the cameras will typically be paper documents or file folders, the present invention can also be used to monitor other objects, such as mugs, computer screens, books, or other objects which may move from one location in an office to another, and which can be marked with a unique identifier.

According to one embodiment, the unique identifiers are printed with ink that is invisible to the human eye unless it fluoresces or phosphoresces. Digital cameras are utilized that include an ultraviolet flash to cause these identifiers to give off light in consequence of their absorption of light produced by the ultraviolet flash. These cameras are equipped with filters to filter out wavelengths other than the wavelengths at which the identifiers emit light. Filtering out extraneous wavelengths allows the camera system to focus on (and/or magnify) images at the emission wavelength, and it also allows the camera system to ensure people's privacy by substantially screening out visual information that would be needed for the cameras to detect, discern, or distinguish human forms, shapes, or identities. It is also possible to use ultraviolet light from another source, instead of (or in combination with) a camera flash; for example, ordinary fluorescent light sources normally emit at least some ultraviolet light.

Reams of pre-marked blank paper are adaptable for use with the present invention, including information on the ream packaging, or enclosed in the packaging, to inform users of the optimal wavelength or wavelengths (e.g., in the ultraviolet or infrared spectrum) for causing unique identifiers on each piece of paper to emit fluorescent or phosphorescent light, and also informing users of the emitted wavelength. This information allows the user to make sure that the camera filters are properly matched with the fluorescent light, and that the camera flash is properly matched with the wavelength needed to cause fluorescence. It is to be noted that ultraviolet light is preferred over infrared light for causing visual fluorescent or phosphorescent effects.

Generally speaking, the present system is for monitoring objects at a plurality of locations, comprising a plurality of cameras, including at least one of the cameras at each of the locations, wherein at least one of the cameras is positioned to view at least some of the objects. A unique identifier is situated on or in each respective one of the objects, for being viewed by at least one of the cameras. A processing center has receiving means to receive monitor signals from the plurality of cameras regarding the unique identifiers. The center also has recording means for recording times and the locations of sightings of each of the unique identifiers.

The method of the present invention is for monitoring objects at a plurality of locations, comprising the step of photographing unique identifiers on the objects using at least one digital camera at each of the plurality of locations. The method also includes the step of sending to a center the unique identifiers that are on each of the respective objects, and the step of recording, at the center, times and the locations of sightings of each of the unique identifiers.

The package or pad of paper of the present invention has unique identifiers respectively included on each sheet of the paper using a substance that normally is substantially invisible to humans, the paper being otherwise substantially blank. The substance is reactive to incoming light having an ultraviolet wavelength by being fluorescent or phosphorescent. The package or pad of paper also includes informational material that describes both the ultraviolet wavelength and the visible wavelength, so the cameras can be chosen or adjusted accordingly. This paper is especially useful for writing by hand, because that is an effective way to make sure that handwritten material includes the unique identifiers. In contrast, when material is printed using a copier, facsimile machine, printer, or the like, such a machine can be adapted to automatically print a unique identifier, or the machine can utilize paper from the package of the present invention so that the paper has preprinted unique identifiers.

The processing center of the present invention is generally for monitoring objects at a plurality of locations. This processing center comprises a plurality of communication ports for receiving monitor signals from a plurality of cameras that view the objects. The center also includes a recognition module, for recognizing a unique identifier that appears on each respective one of the objects, in response to images provided to the center by the monitor signals. The center further includes a recording means for recording the unique identifiers, and for recording times and the locations of sightings of each of the unique identifiers. This does not mean that each camera will necessarily distinguish between an object's position at one part of the camera's viewing area versus another part of the camera's viewing area, but it does mean that the center will take note when an object moves out of sight of one camera and into the sight of another camera.

While the present invention would not create a fully surveilled chain of custody for documents, and is not intended as a security system, it does dramatically increase the ability to locate existing and previous versions of documents and other objects. It also allows more sophisticated queries, such as queries regarding which documents came in close contact with each other at a particular time. Insofar as the cameras obtain images of document content, that content is susceptible to optical character recognition (OCR) by the processing center using techniques that are well known in the art, and such tasks are suitably performed during evening hours using capacity of computers that operate singly or in parallel for this purpose, whereas those computers are used during business hours for ordinary business purposes. The better the computing capacity, the less will be the need for camera quality.

BEST MODE FOR CARRYING OUT THE INVENTION

This invention was inspired by considering how one could use an infinite army with infinite speed and memory to help with document management, without being invasive or placing demands on the user. This virtual electronic "army" simply watches everything, so it can tell you where documents are, where they came from, and what has ever been associated with or said about them. The challenge is to accomplish this in an efficient way, with minimal, negligible or no invasion of privacy that might have any resemblance to "Big Brother." See the novel 1984 by George Orwell, c. 1949.

Each physical object to be observed is recognized by its visible or sometimes-visable properties, possibly in conjunction with its trajectory through space,time, which comprise a unique identifier. The position of each object in the system is tracked with video or still cameras so that two objects that look similar, and that may be only partially seen by the cameras, can be distinguished simply by connecting each to its history, as when one distinguishes the shells in a shell game by watching how they are moved.

The camera system may lose track of an object (e.g., the cameras may be shut off or the object may move beyond the range of sight), which is why trajectory alone cannot be used as a means of identifying the object. In addition to storing a history of the position of each object, the computer system or processing center stores a representation of some of its visible or intermittently-visible properties (as in face recognition) as a backup to the position tracking. For example, if two documents are placed in the same folder at the same time such that their positions cannot be distinguished, the computer distinguishes them when removed on the basis of the difference in their appearance (including difference in size, shape, color, where the letters are on the page, or other unique identifier that may be specially marked on the document or pages thereof).

The choice of which aspects of visual appearance to use for document identification purposes may be determined in a way similar to the way the computer system maintains a multi-relational database which may be indexed by (1) unique identifier for an electronic file (e.g., name/location/ time of creation), (2) unique identifier for an electronic folder of electronic files, (3) time/space coordinates of physical objects, and (4) a representation of what various physical objects look like. If the video cameras see a physical object for which there is no visual representation on record, a representation of what it looks like is created and added to the database. Its time/space coordinates are automatically added in association with the representation whenever the object is seen to move (an artificial intelligence judges whether or not the object is seen to move, factoring in assumptions about how quickly physical objects can move). A new representation is created when the physical object is judged to be transformed (e.g. marked upon, mutilated, etc.), and is added to the database in association with the previous one and the other information associated with the previous one.

If the object is scanned (i.e., an electronic copy of it is created) the resulting electronic file is automatically added to the database in association with its space,time coordinates and a representation of what it looks like, and the representation may be modified to reflect the new information about what it should look like. The new electronic file is automatically added to the electronic folder. Information regarding scanning may be captured at the level of the scandriver/ scanstream. Likewise, whenever an electronic file is printed or fabricated (i.e., a physical copy is made), a representation of what the physical object should look like and its space, time coordinates are added to the database in association with the unique identifier of the electronic file. Information about printing may be captured at the level of the printdriver/ printstream. Whenever an electronic file is modified (e.g., edited or relocated) a new unique identifier is created and added to the database in association with the previous one, and the associated electronic folder is automatically updated.

Another database associates each viewscreen (or other device for presenting electronic files) with a designated person or whomever is in a designated area (e.g. the person who is most in front of the viewscreen) at a given time. When the designated person uses a physical object, the space, time coordinates of the object in use are recorded in the second database. They are also looked up in the first database to find the electronic file and folder associated with those space, time coordinates. The associated file and folder are then displayed on the designated viewscreen or comparable device. Thus, one can access any electronic file simply by using a physical copy of it, for example by holding it or placing it in the center of one's desk.

Authorized users can add/remove/modify additional files in the electronic folders. For example, an attorney might record dictation about how his/her secretary is to respond to a given piece of correspondence and might add an electronic file containing that dictation to the electronic folder associated with that piece of correspondence. The attorney might also add other related files including templates, previous correspondence, WWW sites, pictures, or other items to the folder. Upon removing a physical copy of the correspondence in his/her in-box, the dictation and so forth would be made accessible on the secretary's view screen. Since the electronic folder may be accessible throughout the computer network, it may be common to include special files for special audiences in special subfolders addressed to them and with special security options. By associating a different file with each page of a physical document, one could ensure that different notes are brought to the fore as the secretary turns to different pages, and the electronic display of the document could be made to flip pages in sync.

Perhaps even more useful, is the ability to search for both electronic files and the recorded space, time trajectories of their physical manifestation(s). A computer program may be made available that would generate a list of space, time coordinates and electronic file identifiers for which the associated information matches given search criteria. For example, given a range of time and list of spaces, the program might list both the current physical space,time coordinates and/or associated electronic files of all physical objects that passed through a space on that list during the time range (e.g. "show me all things seen in my office last Tuesday"). As a special version of this, one can use the second database to query for the objects used by a given set of people over a given time range. The lists of objects might be further narrowed down by specifying what the objects looked like (e.g. their colors, size, shape, patterns that appeared on them), or what electronic files would be in folders associated with them (e.g. previous or later versions of the document, etc.). In addition, one might find a list of electronic files by other means (e.g. keyword search, category sort) and get a list of the current space, time coordinates of physical objects associated with them.

Figure 1A:
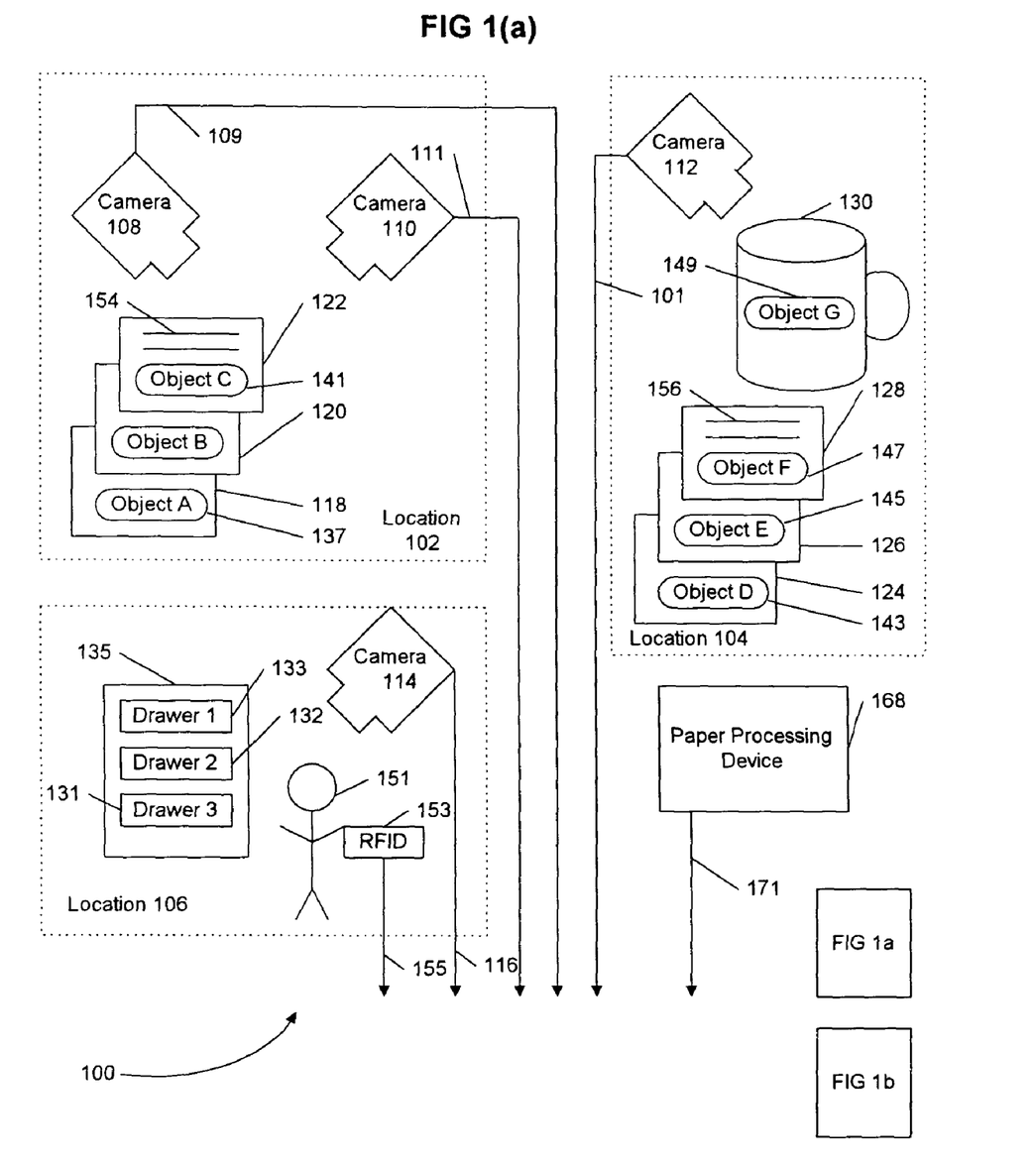
FIG. 1(a) shows the upper part of a system according to the present invention.
Figure 1B:
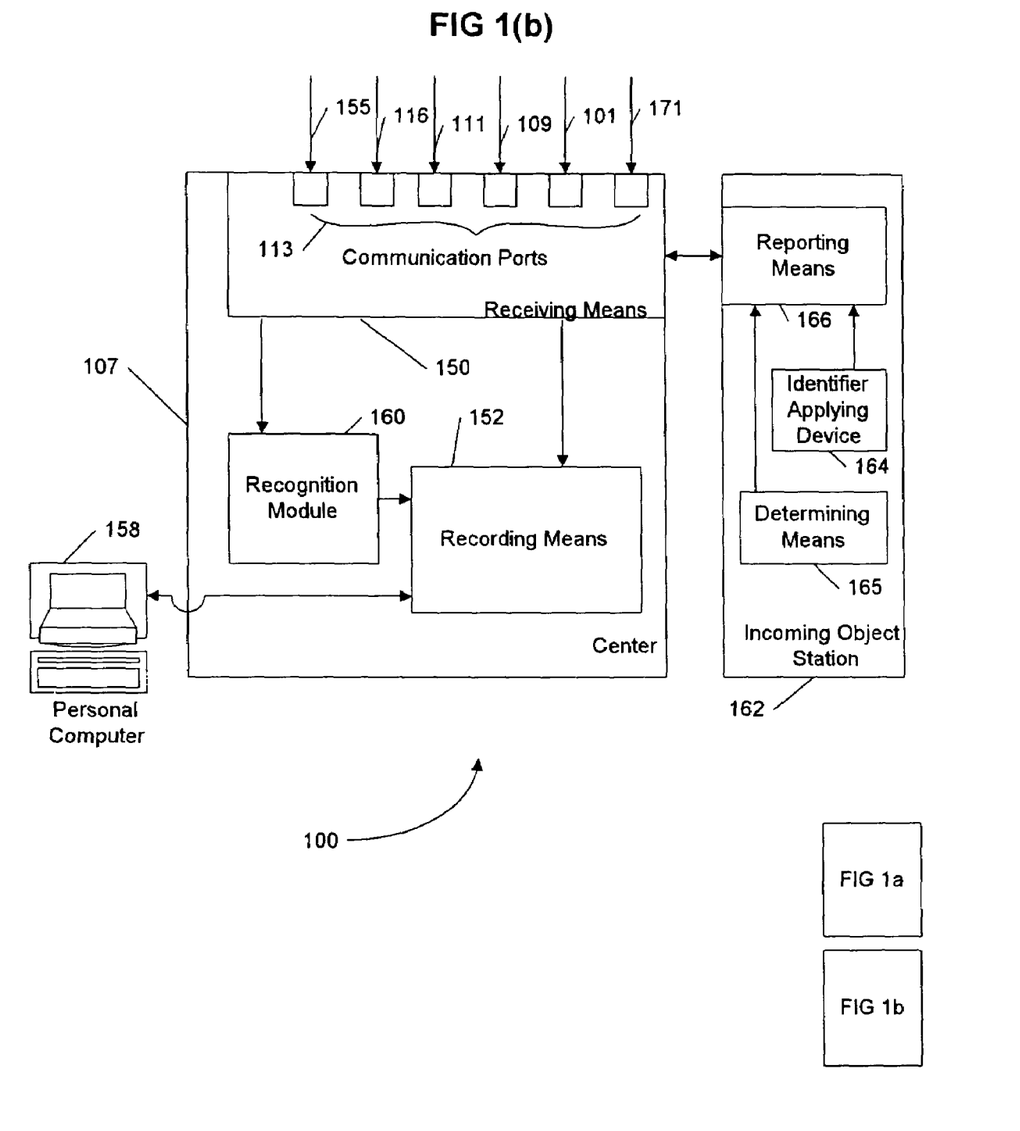
FIG. 1(b) shows the lower part of a system according to the present invention.

FIG. 1(a) shows a system 100 according to the present invention, and as indicated FIG. 1(a) is continued on a separate sheet where FIG. 1(b) shows the remainder of the system 100. FIG. 1(a) shows three locations: location 102, location 104, and location 106. Each location includes at least one camera that sends a respective signal to the processing center 107 shown in FIG. 1(b). Location 102 includes camera 108 that sends a signal 109. Location 102 also includes camera 110 that sends the signal 111. Location 104 includes camera 112 which sends a signal 101, and location 106 includes camera 114 which sends signal 116. All of these monitor signals from the cameras are sent to the center 107 in FIG. 1(b).

Each of these cameras is positioned to view at least some of the objects. The objects may be paper items as are the objects 118, 120, and 122 at location 102, and as are the objects 124, 126, and 128 at location 104. However, the objects viewed by the cameras are not restricted to paper items. For example, the mug 130 at location 104 is obviously not a document, nor are the drawers in the file cabinet 135 at location 106. Whether or not they are documents or something else, all of the objects have a unique identifier. The unique identifiers 131, 132, 133, 137, 139, 141, 143, 145, 147, 149 are all for being viewed by the respective cameras. Camera 114 is also for detecting use of the drawers, so that it will be evident which drawer has been opened for inserting or withdrawing a paper or file. Likewise, it will be useful for the center 107 to keep a record of who opened the drawer, and thus it is useful for each person 151 to have a radio frequency identification (RFID) tag 153 which sends an RFID signal 155 to the center 107.

Note that each of the cameras shown in the embodiment of FIG. 1(a) is situated so that the cameras at most locations can view one of the unique identifiers at a particular time. In other words, cameras 108 and/or 110 may be positioned to view object 120, but object 120 is not viewable by cameras 112 or 114, at least not until the object 120 moves to location 104 where it will then be undetectable by cameras 108 and 110. Other embodiments of the present invention are possible wherein there is some overlap in coverage by the cameras of different locations, and that can sometimes be advantageous in some respects, for example, because unique identifiers in an area of overlap will be more easily detected by two sets of cameras than by one.

The center 107 has receiving means 150 to receive the monitor signals 116, 111, 109, and 112 via communication ports 113 from the plurality of cameras 108, 110, 112, and 114 regarding the unique identifiers 131, 132, 133, 137, 139, 141, 143, 145, 147, 149. Of course, if these monitor signals are transmitted wirelessly, then the communication ports represented in FIG. 1(b) are one and the same thing, namely a single receiver. The center 107 furthermore has recording means 152 for recording times and the locations of sightings of each of the unique identifiers, as indicated by the monitor signals 116, 111, 109, and 112.

As seen in FIG. 1(a), the object 122 has content 154, and the object 128 has content 156, and the respective cameras are for viewing that content, in addition to viewing the unique identifiers, and in fact it is sometimes useful for a unique identifier to be included in the content. In any case, the content is sent by the cameras in the respective monitor signals to the center 107. The content will typically be alphanumeric text.

At the center 107, the content is recorded by the recordation means 152 in coordination with the respective identifiers; for example, the content 154 is recorded in coordination with the unique identifier 141. The content and the unique identifiers recorded at the center 107 are accessible by users, for example, using a personal computer 158. Moreover, the content and the unique identifiers are preferably sent to a recognition module 160 in the center 107, where character recognition is performed, and then the results are recorded in the recording means 152. It is to be borne in mind that the objects will typically be papers, envelopes, cardboard items, and/or files, and thus the recording means 152 will be able to keep records of the location of each paper as a function of time, plus images of each paper as a function of time, plus searchable text of each paper as a function of time. The recording means 152 will also be able to supply information necessary to make other determinations, such as when and where any two unique identifiers were sighted at the same location and time, or which documents were sighted at a particular location during a particular interval of time.

The unique identifiers 131, 132, 133, 137, 139, 141, 143, 145, 147, and 149 utilize an ink that normally is substantially invisible to humans (e.g., absent excitation of the ink), although these unique identifiers are shown in plainly visible black ink for purposes of illustration in FIG. 1(*a*). For example, the unique identifier 141 comprises luminescent material and is invisible to humans (at least when it is not fluorescing or phosphorescing), and at least part of the content 154 is printed or written using an ink having luminescent properties substantially similar to luminescent properties of the luminescent material. Typically, the ink used for the content will be doped with the luminescent material, so that the content will always be visible to humans whereas the unique identifier will not be.

FIG. 1(*b*) further shows an incoming object station 162, for applying incoming unique identifiers to incoming objects utilizing an identifier applying device 164, and furthermore for using a reporting means 166 to report to the center 107 the incoming unique identifiers along with corresponding information about the incoming objects. This incoming object station 162 may, for example, be located in a mail room, or, it may be distributed at several different places. Some incoming objects may already have identifiers included, and in that case it should be determined by a determining means 165 if those identifiers were applied by some unknown outside entity, or by an outside entity having an identifier system that is integrated with that of the center 107, or perhaps the identifiers were applied in-house to a document that is returning. The incoming object station 162 in this embodiment will have the capability to simply cross out or otherwise cancel an identifier applied by an unknown outside entity, and instead apply a new unique identifier. Or, if the outside entity is known, then the already-included identifiers are still usable in-house and in fact are useful for determining the origin of incoming items.

Incoming objects that already have identifiers included may have sets of identifiers separately included on both an envelope and on papers inside the envelope, and when the incoming object station 162 detects a difference or discrepancy or lack of consistency between those sets of identifiers then special treatment will sometimes be appropriate for that incoming material. For example, such a discrepancy will often raise a heightened concern about fraud, or about some other inappropriate activity.

FIG. 1(*a*) shows a paper processing device 168 for reporting via device signal 171 to the center 107 electronic images and/or text of paper items being processed, and for reporting the unique identifiers of the paper items. This paper processing device 168 may be a printer, sorter, copier, or facsimile machine. The paper processing device may be equipped with the ability to apply the unique identifiers, although this will not be necessary if the entire office uses blank paper that is preprinted or pre-manufactured with unique identifiers.

Figure 2A:
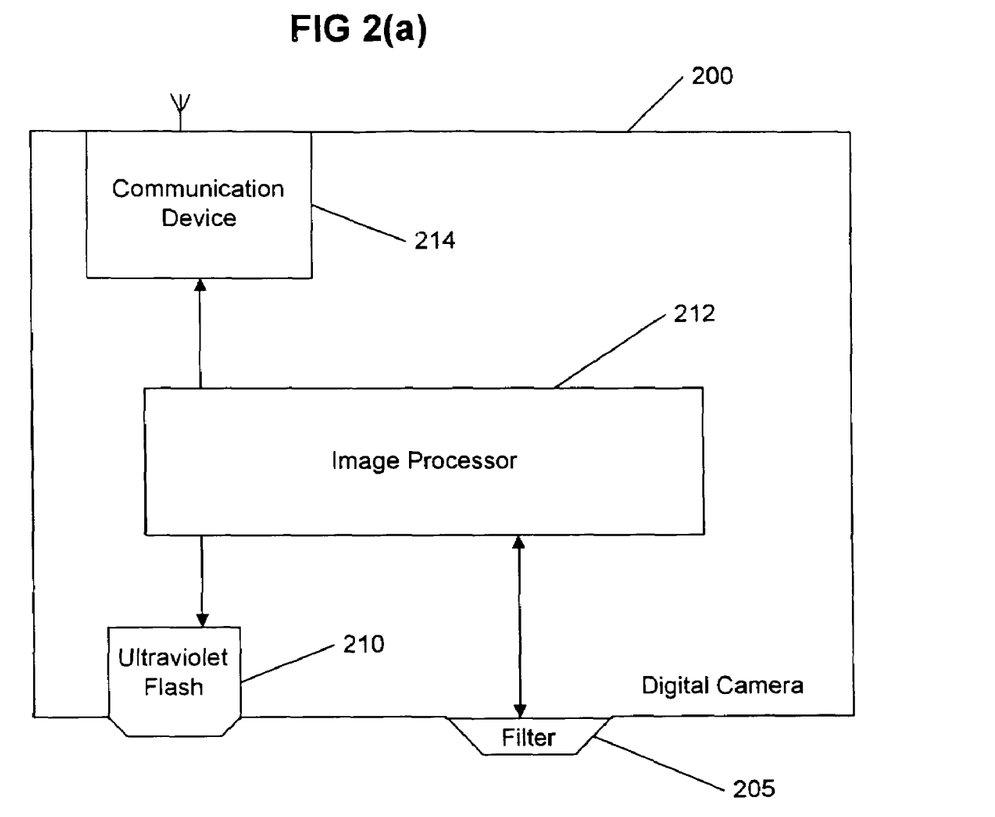
FIG. 2(a) shows a digital camera according to the present invention.

Turning now to FIG. 2(*a*), a digital camera 200 is shown, including a filter 205 for filtering out colors (i.e. visible or invisible wavelengths) that are unnecessary to observe the ink when it fluoresces, and/or for filtering out sufficient light so that human forms are substantially invisible to the cameras. The camera 200 is a digital camera including an infrared or ultraviolet flash 210, for capturing images at regular intervals using the flash. The unique identifiers on the observed objects comprise luminescent material that is invisible to humans at least between the flashes from the flash 210. The unique identifiers 131, 132, 133, 137, 139, 141, 143, 145, 147, and 149 luminesce in a certain range of the spectrum when exposed to the flash, and the camera 200 is equipped with a filter for filtering out light that is outside the certain range, and/or for filtering sufficient light so that human forms are substantially invisible to the cameras. The digital camera includes an image processor 212 for converting a raw image to electronic form (e.g., jpg, gif, or tiff), and the digital camera also includes a communication device 214 for sending the electronic image to a processing center. The communication device may be a transceiver for wireless communication, or a port for a hard wire.

Figure 2B:
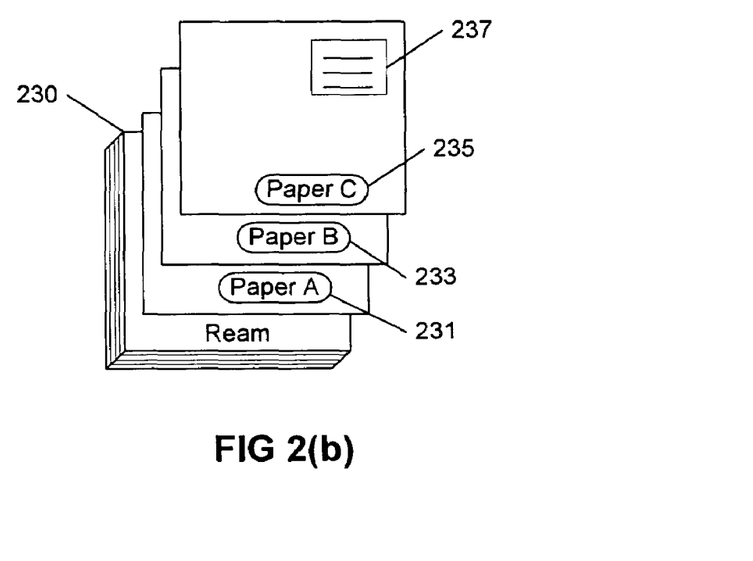
FIG. 2(b) shows a ream of paper according to the present invention.

FIG. 2(*b*) shows a package or pad or ream of substantially blank paper 230 having unique identifiers 231, 233, and 235, respectively, included on each sheet of the paper utilizing a substance that normally is substantially invisible to humans. The paper is otherwise substantially blank, and the substance is reactive to incoming light having an ultraviolet wavelength by being fluorescent at least at a visible wavelength. The package or pad 230 also includes informational material 237, for example on the packaging or top sheet only, that describes both the ultraviolet wavelength and the visible wavelength. This enables the cameras to be accurately selected or adjusted to conform with the informational material.

There are some areas where filters are not needed, i.e., secure areas where one wants the cameras to clearly see people. However, an advantage of a filter is that it increases contrast for the camera. Therefore, in secure areas, an enhanced UV flash or other UV light source may be needed. No flash will be needed for a camera if there is another adequate source of UV light, for example, UV light emanating from a fluorescent tube that is used for ordinary indoor lighting.

Figure 3:
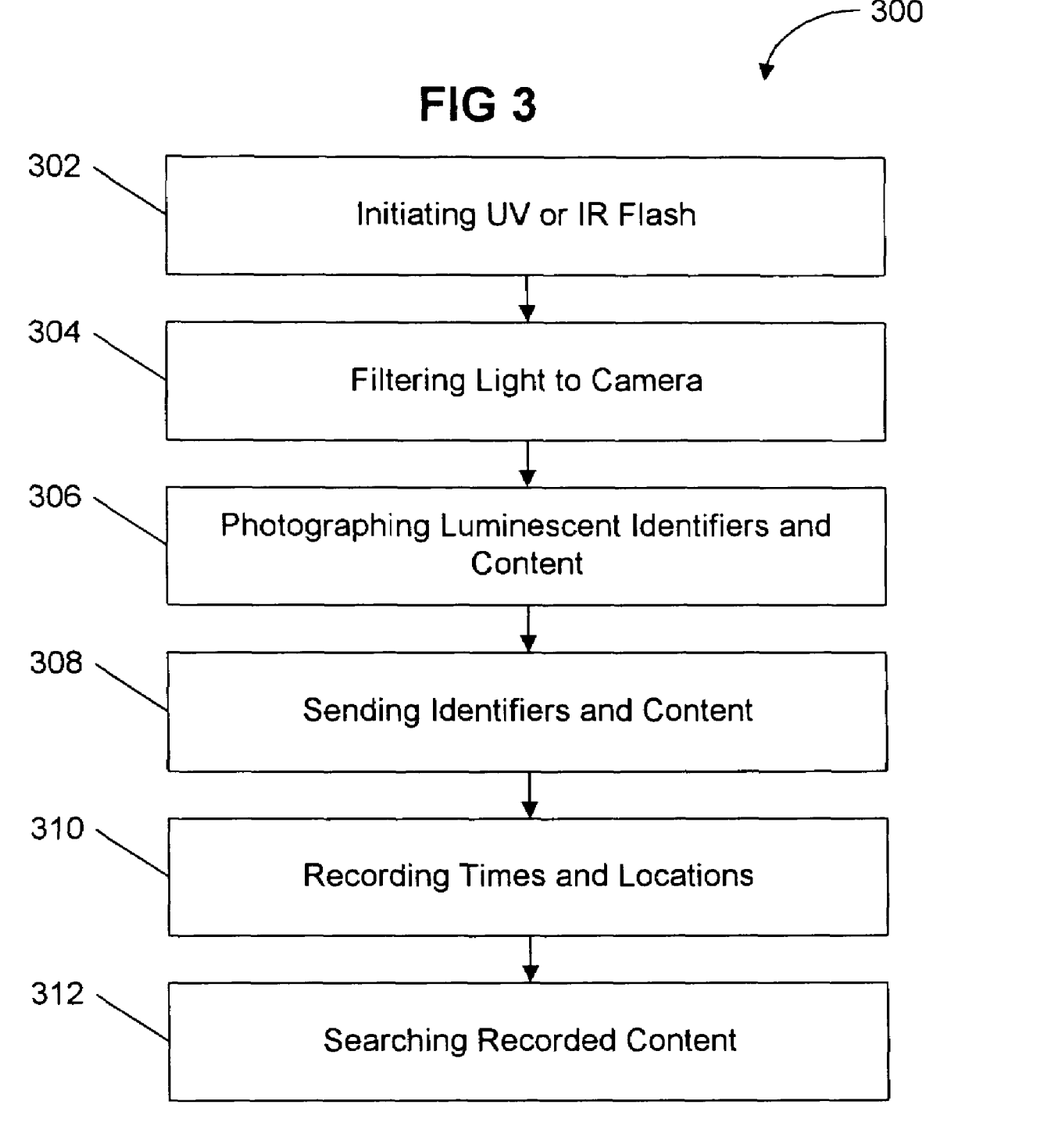
FIG. 3 is a flow chart illustrating a method according to the present invention.

Turning now to FIG. 3, the method 300 is for monitoring objects at a plurality of locations, including the steps of initiating 302 an ultraviolet or infrared flash, filtering 304 light that is incoming to the camera, photographing 306 unique identifiers on the objects using at least one digital camera at each of the plurality of locations, sending 308 to a center images or information about the unique identifiers that are on each of the respective objects, recording 310 at the center times and the locations of sightings of each of the unique identifiers, and searching 312 recorded content. This method is extendable by using an infrared or ultraviolet flash that causes the unique identifiers to luminesce in a certain range of the visible spectrum, filtering out light outside the certain range, and filtering out sufficient light so that human forms are substantially invisible to the cameras.

However, it must be recognized that secure areas require cameras to clearly see people. Therefore, in secure areas, an enhanced UV flash or other UV light source will often be needed in order to compensate for the absence of a filter on the camera. No flash will be needed for a camera, be it in a secure area or not, if there is another adequate source of UV light, as mentioned previously.

Figure 4:
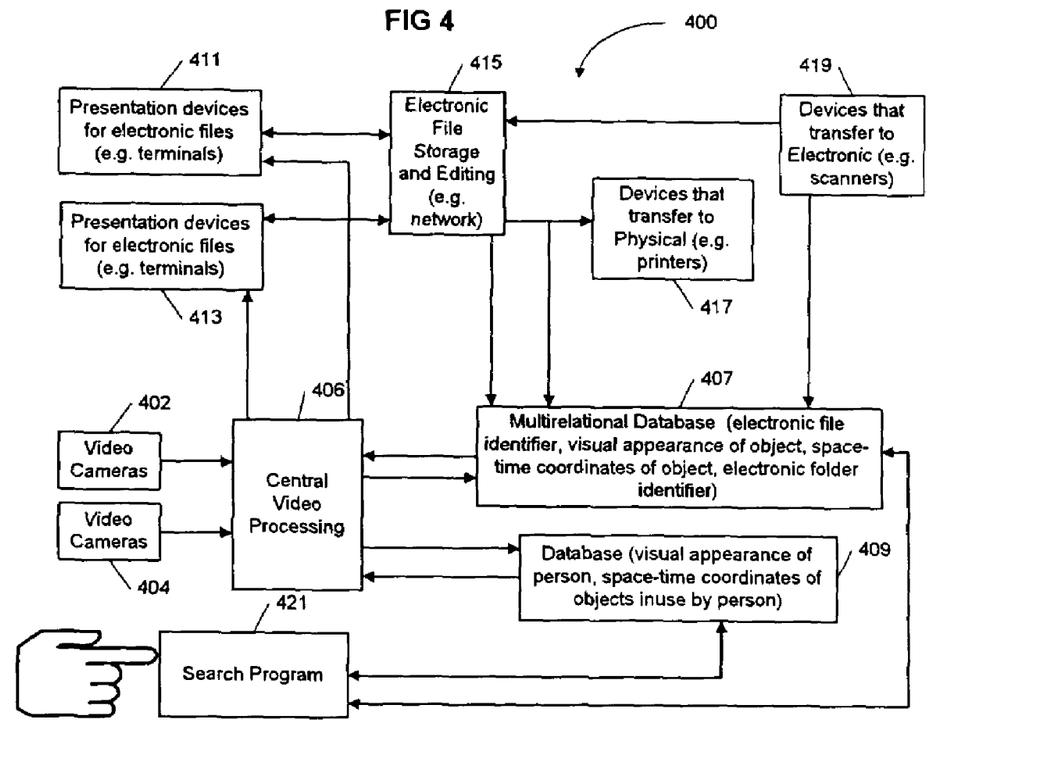
FIG. 4 is a block diagram describing components of an embodiment of the system of the present invention.

Turning now to FIG. 4, this is a block diagram describing components of an embodiment of the system 400 of the present invention. The cameras 402 and 404 view a physical object that is being used, as opposed to being in storage. A video image is then sent to central processing 406, where the object is recognized, and the user is also identified either by the camera image or, preferably, by the user's RFID tag. Databases 407 and 409 are available to be consulted to assist in recognition. The time-space coordinates and/or record of appearance of the object are updated (or created) in database 407, and the time-space coordinates and/or record of appearance of the user are updated in database 409. The identifiers of the electronic file and folder, as found in database 407, are sent to the presentation devices 413. Using the identifiers, a presentation device automatically accesses the electronic file and folder. These may be edited and moved in the editing and storage network 415. When electronic files and folders are moved in the storage system, the identifiers are automatically updated in database 407. When electronic files or folders are edited, new versions are given new entries in database 407. The old and new version are associated with each other.

When physical copies are made of electronic files using printers 417 or the like, corresponding new entries are automatically made in database 407, using the space, time coordinates of the fabrication device as that of the object. When electronic copies are made of physical objects using scanners 419 or the like, the identifiers of the resulting files are automatically added to database 407. Authorized users can search for entries in the databases, using a search program 421. For example, from database 409 they can get a list of the space, time coordinates of all objects a certain person used over a certain time span, then from database 407 they can get a list of file identifiers for all objects sharing those space, time coordinates. This will also reveal the current space, time coordinates of the objects, those coordinates being approximate of course, but sufficient to enable those objects to be found. Users can also sort (or further narrow the sort) by appearance of the object, what to find in the associated electronic folders, etc. Users may also find the electronic files by other means, for example, by keyword search in a keyword database, and then the user gets a list of current space, time coordinates of the results.

The best mode embodiment of this invention can be extended by providing means to relay space, time coordinates to a person. When a user searches for a physical object for which the space, time coordinates have been identified, after the user is told which room to go to (e.g. by room number or name), such a person may be directed within the room by presenting on a view screen the image currently seen by the camera with a "crosshairs" or other graphic indicating the location of the object. Alternatively, the user is directed within the room by presenting a scaling signal as the user moves and gestures within the room. For example, there may be a sound which gets louder as the user's hand gets closer to or points towards the object (as with a metal detector). Other examples of scaling signals include the pitch of a sound, the time between ticks, the color of an area of a viewscreen, or the height/length of a bar on a viewscreen. Alternatively, the user is directed within the room by a pointer projected from a light (e.g., laser) attached to the camera in that room. The pointer would illuminate the location of the document.

The best mode embodiment of this invention can be extended by providing means to make documents more easily distinguishable to cameras. To make similar documents more easily distinguishable to cameras, the documents may have identifying codes printed on them with ink that is not visible to humans, but is visible to cameras (e.g., infrared cameras), or may be printed on a paper with different backgrounds (e.g., different colors, patterns), or may have marks made on their edges. When a camera sees a new object that has not been scanned, it may look through the database for entries with similar space, time coordinates and visual representations, and if another object that is liable to become confused with it is found, the system may signal the user to tag one of the objects (i.e., with a sticker, mark, tinting the paper, etc.)

An alternate way to make documents more easily distinguishable to cameras is for them to be printed with attractive borders that hide identifying glyphs; or, the documents may have identifying glyphs printed on them with photochromatic dyes. When documents need to be identified, a bright flash of light may be applied to reveal the glyphs. Alternately, the shapes of the characters in the document may be slightly altered, for example, by making the width of some lines slightly larger, to create an overall pattern across the page that may be recognized by a computer. A special identifier for the document may be hidden in it steganographically.

The best mode embodiment of this invention can be extended by providing means to keep track of objects placed in mobile containers. To keep track of objects placed in mobile containers, such as envelopes or piles, a third database may be added that associates the space, time coordinates of each container seen by cameras, associating its appearance, space, time coordinates, and contents. When an object is placed in the container, its space, time coordinates in the first database may be replaced with a reference to the container. The best mode embodiment of this invention can be extended by providing means to transfer from a physical filing system to an electronic filing system. The physical location of an object, such as a document in a certain pocket of a certain folder on a certain shelf in a library, often indicates a category that should be associated with any electronic copies of that document. The current invention builds on the above means to keep track of objects placed in mobile containers by allowing the user to associate various categories (e.g. case numbers, document type), with various containers and areas of space, time coordinates. The present system then looks up every object that has been in any of these coordinate ranges or containers and adds a note to the associated folder to indicate that the object belongs to the named category. It may similarly be set to add notes to any objects that pass through those coordinates or containers in the future. Thus, rather than type in category information when scanning documents, one may ensure that the information will be added automatically by setting up cameras to observe the user as he/she removes it from the physical filing system.

The best mode embodiment of this invention can be extended by providing means to detect when a physical object does not make its intended tour. A user may intend for a physical object to make a particular tour. For example, a litigation attorney may want a document to be checked by certain people and then delivered to a certain location by a certain time and date. If they can detect which objects have fallen behind schedule on this tour, then they can take the steps to expedite them. Given the current invention, this can be done with a program in which the user inputs a tour with a schedule of times before which the object is to reach each stop on the tour. The program includes a clock that indicates when each of the times occur, and this triggers the program to check the databases to see whether the object has reached the designated location or person within the designated time window. If not, the program alerts the user, for example by sending the user an email, puts a pop-up on the user's desktop, calls the user's pager, or calls the user's phone.

The best mode embodiment of this invention can be extended by providing means to handle objects that leave visible range. It is helpful to have some means to deal with a situation in which two visually similar objects are placed in the same container or leave the range of the cameras. This situation is dealt with by keeping the space, time trajectories in another database separate from the first database. Each of the trajectories would be associated in the new database with a unique trajectory name/code. In the place of space, time coordinates in the first database, there would be probability distributions over the various trajectory names/codes. To save space, the first database need only record probabilities for the most probable trajectories. Then, when queried for the physical location of an object, the search program can report a list of possible locations, ordered by probability. When someone uses an object, and the recorded probability associated with the trajectory of that object is not 100%, the user is asked to confirm the identity of the object, and then the probabilities are updated. Probabilities may be automatically updated when objects are removed from a container, for example, when a pile of documents is removed, there may be a 50-50 chance that a document remains in the folder or is in the pile; but, when the document is later removed from the pile, this probability is revised. Probabilities are alternatively automatically updated if an object is scanned.

The best mode embodiment of this invention can be extended by providing additional means to protect privacy while monitoring space, time coordinates via camera. The system's ability to track objects would be limited by the scope of locations in which cameras are available, and privacy issues may prevent cameras from being placed in certain location (e.g., a bathroom). This is an additional means of protecting privacy, in addition to the concept that the cameras at other non-bathroom locations are already equipped with filters to filter out light except that small range of wavelengths necessary to perceive fluorescing unique identifiers. Preferably, the filters are removable for various purposes (e.g., for cleaning purposes or to replace a filter with another filter that filters out different wavelengths). Any occupant of an office where a camera is located can look through a removed filter and see that it filters out almost all visible light, so that human forms are substantially invisible. Moreover, equipping office occupants with radio frequency identification (RFID) tags is not only useful so that the present system can identify who is putting documents in file cabinets or removing such documents, but is also useful for demonstrating to workers in an office that they cannot otherwise be identified using the cameras.

The best mode embodiment of this invention can be extended by providing additional means to achieve quality control on copy jobs. People who use a copy center normally have to go through all of the copy results by hand to make sure the copy center did not skip any pages or mix up their order. A small extension to the current invention solves the problem. Note that copiers are both devices that transfer to electronic and devices that transfer to physical. The small extension is a program that asks the user to define what is supported to be delivered by the copy shop, in terms like "fifteen copies of each document in this box," which is taken to mean that the pages of each document are to be in the same order as those in the box. The copy shop can then place the results of the copy job in a designated area and query the system as to whether the contents of that area meet the definition for the competed job. The copy shop customer does the same thing to confirm that the job was completed properly. In other words, at either or both the pick-up point and the delivery point of a copy job, the unique identifiers on the pages of the copy job will be inspected to make sure that pages have not been skipped or mixed up.

Various changes may be made in the above illustrative embodiments without departing from the scope of the invention, as will be understood by those skilled in the art. It is intended that all matter contained in the above description or shown in the accompanying drawings shall be interpreted as illustrative and not in a limiting sense. The invention disclosed herein can be implemented by a variety of combinations of hardware and software, and those skilled in the art will understand that those implementations are derivable from the invention as disclosed herein.

What is claimed is:

1. A system for monitoring objects at a plurality of locations, comprising:
    a plurality of cameras, including at least one of the cameras at each one of the locations, wherein at least one of the cameras is positioned to view at least some of the objects; and the cameras are each equipped with a filter for filtering out colors that are unnecessary to observe and for filtering out sufficient light so that human forms are substantially invisible to the cameras;
    a unique identifier that utilizes an ink that normally is substantially invisible to humans on or in each respective one of the objects, for being viewed by at least one of the cameras;
    a center having receiving means to receive monitor signals from the plurality of cameras regarding the unique identifiers;
    wherein the center also has recording means for recording times and the locations of sightings of each of the unique identifiers.

2. The system of claim 1, wherein a plurality of the objects are paper items, and the cameras are also for viewing content of the paper items, and for sending said content to the center for recordation in coordination with the respective unique identifiers, and
    wherein said content recorded at the center is searchable by users.

3. The system of claim 1, wherein each object comprises at least one paper, envelope, cardboard item, or file, and
    wherein the center is also for performing character recognition on content.

4. The system of claim 2, wherein the unique identifiers comprise luminescent material, and wherein at least part of said content is printed or written using an ink having luminescent properties substantially similar to luminescent properties of the luminescent material.

5. The system of claim 1,
    wherein each of the cameras is a digital camera including an infrared or ultraviolet flash, for capturing images at regular intervals using the flash;
    wherein the unique identifiers comprise material that is invisible to humans at least between the flashes; and
    wherein the unique identifiers emit light in a certain range of the spectrum when exposed to the flash.

6. The system of claim 5, wherein the cameras are each equipped with a filter for filtering out light that is outside the certain range, and for filtering sufficient light so that human forms are substantially invisible to the cameras.

7. The system of claim 1,
    wherein the objects at least one of the locations include drawers of a file cabinet;
    wherein the cameras are also for detecting use of the drawers; and
    wherein the cameras are situated so that the cameras of at most one location can view one of the unique identifiers at a particular time.

8. The system of claim 7, wherein a person who accesses the file cabinet is equipped with a radio-frequency identification (RFID) tag having an RFID signal that is reported to the center.

9. The system of claim 1, wherein the center is for user access via at least one computer, and wherein the center is for providing data regarding particular sets of the times and the locations at which a particular one of the unique identifiers was sighted, and also for providing data about other unique identifiers that were also sighted at the particular sets of the times and the locations.

10. The system of claim 8, wherein the center is for user access via at least one computer, and wherein the center is for providing data regarding particular sets of the times and locations at which a particular one of the unique identifiers was sighted, and also for providing relevant radio-frequency identification data.

11. The system of claim 1, further comprising an incoming object station, for applying incoming unique identifiers to at least some incoming objects, and furthermore for reporting to the center the incoming unique identifiers with corresponding information about the incoming objects.

12. The system of claim 1, further comprising at least one paper processing device for reporting to the center electronic images of paper items being processed, and for reporting the unique identifiers of the paper items.

13. The system of claim 12, wherein the paper processing device is a printer, sorter, copier, or facsimile machine.

14. The system of claim 11, wherein the incoming object station further comprises determining means for determining whether incoming material already includes incoming identifiers, and if so determining whether at least some of the incoming identifiers are adequate for use in-house.

15. The system of claim 11, wherein the incoming object station further comprises determining means for determining whether incoming material already includes incoming identifiers, and also for determining whether the incoming identifiers indicate at least one source from which the incoming material came.

16. The system of claim 15, wherein the determining means is also for determining whether the at least one source is self-consistent or consistent with other indications in the incoming material as to the source.

17. A method of monitoring objects at a plurality of locations, comprising the steps of photographing unique identifiers on the objects using at least one digital camera at each of the plurality of locations;

sending to a center the unique identifiers that are on each of the respective objects;

recording, at the center, times and the locations of sightings of each of the unique identifiers;

capturing content of each of the objects using the digital cameras;

sending said content to the center for recordation in coordination with a respective one of the unique identifiers;

searching the content recorded at the center;

using an infrared or ultraviolet flash that causes the unique identifiers to luminesce in a certain range of the visible spectrum;

filtering out light outside the certain range; and filtering out sufficient light so that human forms are substantially invisible to the cameras.

18. A system for monitoring objects at a plurality of locations, comprising:

a plurality of cameras, including at least one of the cameras at each one of the locations, wherein at least one of the cameras is positioned to view at least some of the objects;

a unique identifier on or in each respective one of the objects, for being viewed by at least one of the cameras:

a center having receiving means to receive monitor signals from the plurality of cameras regarding the unique identifiers;

wherein the center also has recording means for recording times and the locations of sightings of each of the unique identifiers;

wherein each of the cameras is a digital camera including an infrared or ultraviolet flash, for capturing images at regular intervals using the flash;

wherein the unique identifiers comprise material that is invisible to humans at least between the flahes;

wherein the unique identifiers emit light in a certain range of the spectrum when exposed to the flash;

wherein the cameras are each equipped with a filter for filtering out light that is outside the certain range, and for filtering sufficient light so that human forms are substantially invisible to the cameras.

* * * * *